(12) United States Patent
Dendy et al.

(10) Patent No.: US 8,938,061 B1
(45) Date of Patent: Jan. 20, 2015

(54) SYSTEMS AND METHODS FOR CONFIGURING AND REGISTERING INTERNET PROTOCOL (IP) PHONES

(75) Inventors: Scott William Dendy, Arab, AL (US); Michael F. Lamy, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 13/538,864

(22) Filed: Jun. 29, 2012

(51) Int. Cl.
*H04M 7/00* (2006.01)

(52) U.S. Cl.
USPC .......................................... 379/225; 370/401

(58) Field of Classification Search
CPC .. H04M 7/009; H04Q 3/62; H04Q 2213/1322
USPC .............. 379/67.1, 93.14; 370/338, 352–356, 370/395.5, 401
See application file for complete search history.

(56) References Cited

U.S. PATENT DOCUMENTS

| 2001/0026545 | A1* | 10/2001 | Matsumoto et al. | 370/338 |
| 2004/0042461 | A1* | 3/2004 | Nasiri et al. | 370/395.5 |
| 2007/0217434 | A1* | 9/2007 | Welbourn | 370/401 |
| 2011/0026516 | A1* | 2/2011 | Roberts et al. | 370/352 |

* cited by examiner

*Primary Examiner* — Fan Tsang
*Assistant Examiner* — Van D Huynh
(74) *Attorney, Agent, or Firm* — Maynard Cooper & Gale, P.C.; Jon E. Holland

(57) ABSTRACT

A system for configuring and registering Internet Protocol (IP) phones has at least one IP phone coupled to a private branch exchange (PBX) through a switch. A boot server stores a plurality of configuration files used to configure IP phones, and the IP phone downloads a default configuration file having a default extension identifier from the boot server in order to allow the IP phone to initiate a registration session with the PBX. Once the registration session is initiated, the PBX is configured to automatically learn a media access control (MAC) address of the IP phone and to generate at least one unique configuration file identified by the learned MAC address. The IP phone is then configured according to the generated unique configuration file without an administrator having to associate the MAC address with the extension identifier.

7 Claims, 5 Drawing Sheets

US 8,938,061 B1

SYSTEMS AND METHODS FOR CONFIGURING AND REGISTERING INTERNET PROTOCOL (IP) PHONES

RELATED ART

A private branch exchange (PBX) system is often used to serve as a telephone exchange for offices of a particular business or organization. An internet protocol (IP) PBX system stores configuration files for specific phone models and phone extensions, and such configuration files are often described or identified by a unique media access control (MAC) address of the phone. Each phone in the PBX system typically requires a unique extension identifier. Thus, an association between the MAC address of a given phone and its extension identifier is needed.

During phone installation and configuration, an administrator often makes such association between the phone's MAC address and extension identifier by submitting manual inputs through a PBX system graphical user interface (GUI). However, such process is typically time-consuming, particularly for PBX systems serving large organizations. Thus, the process of distributing phones to the offices of the organization serviced by the PBX system and determining which phone is actually installed in a given office so that its MAC address can be correctly associated with its extension identifier is burdensome to an administrator and prone to errors.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for configuring and registering IP phones. A system in accordance with an exemplary embodiment of the present disclosure comprises at least one IP phone coupled to a PBX through a switch. The PBX, a boot server, a dynamic host configuration protocol (DHCP) server, and a router are coupled to the switch, and the router is also coupled to a wide area network (WAN). The boot server stores a plurality of configuration files used to configure IP phones. The DHCP server is configured to assign an IP address to the IP phone, and the IP phone is configured to download a default configuration file having a default extension identifier from the boot server in order to allow the IP phone to initiate a registration session with the PBX. Once the registration session is initiated, the PBX is configured to automatically learn a media access control (MAC) address of the IP phone and to generate at least one unique configuration file identified by the learned MAC address. The IP phone is then configured according to the generated unique configuration file.

Figure 1:
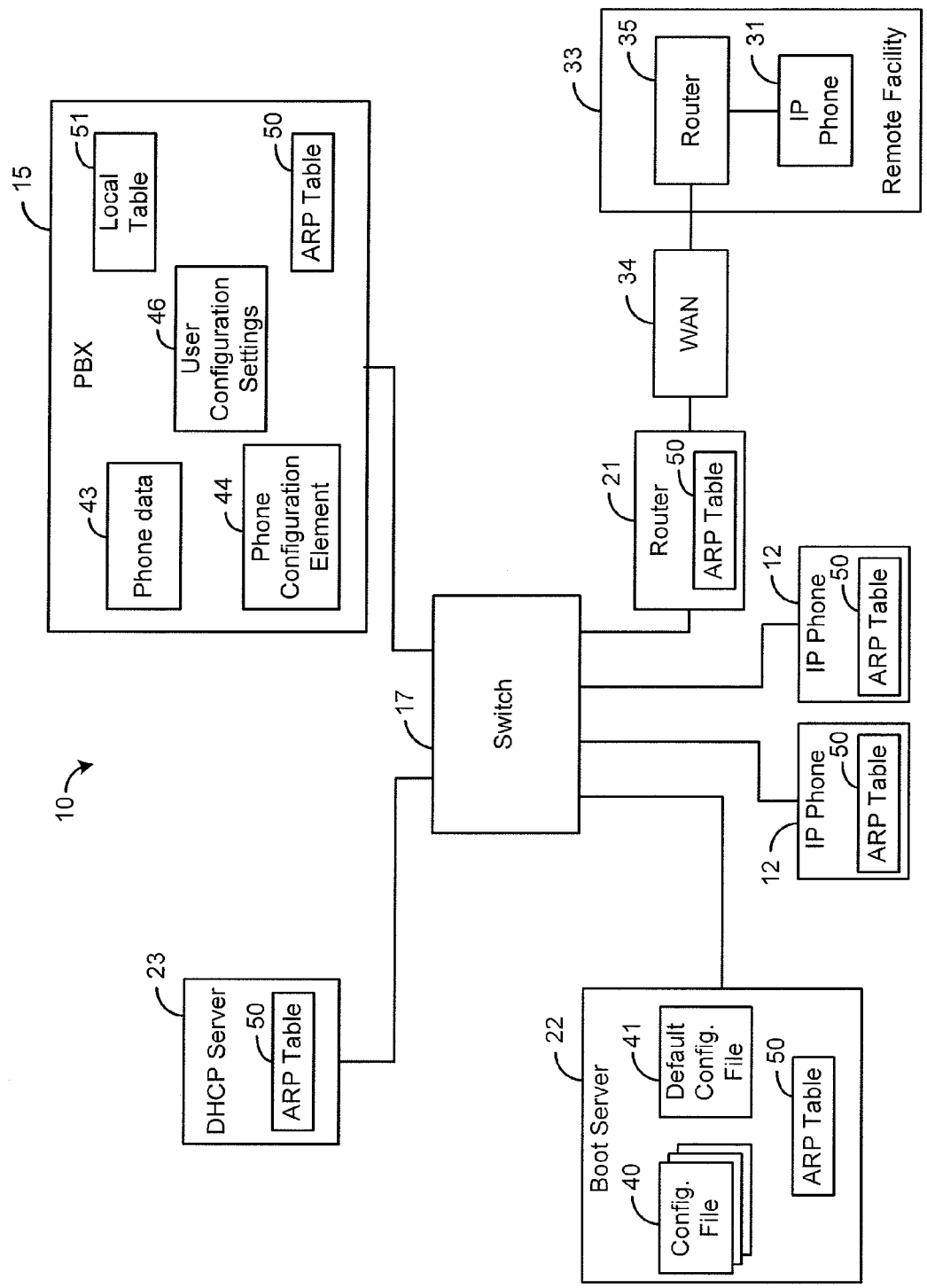
FIG. 1 is a block diagram illustrating an exemplary PBX system in accordance with the present disclosure.

FIG. 1 depicts an exemplary embodiment of a PBX system 10. The PBX system 10 comprises at least one IP phone 12 coupled to a PBX 15 through a switch 17. In one embodiment, the switch 17 is a Layer 2 switch, such as an Ethernet switch, that forwards packets based on their destination MAC addresses, but other types of switches are possible in other embodiments. The switch 17 is also coupled to a boot server 22 and a DHCP server 23. In some embodiments, the system 10 may have at least one IP phone 31 located at a remote facility 33 (e.g., a remote office or other remote location) which is remote from the PBX 15. In this regard, FIG. 1 shows a remote IP phone 31 which is coupled to a router 21 through a wide area network (WAN) 34. The IP phone 31 is coupled to the WAN 34 via a router 35, which is located at the remote facility 33. However, the router 35 may be located in different locations in other embodiments.

The boot server 22 stores a plurality of configuration files 40 and 41 that are used to configure the IP phones 12 and 31 of the system 10, as will be described in more detail hereafter. Further, the PBX 15 stores phone data 43 and user configuration settings 46. The phone data 43 maps the IP address of each phone 12 and 31 to the phone's extension identifier. The user configuration settings 46 are defined by a user and indicate, for each IP phone 12 and 31, a user's preferences for user-configurable features, such as, for example, button layout, language, screen display, busy lamp field, speed dials, and phonebook entries. Furthermore, the PBX 15 comprises a phone configuration element 44 configured to update the phone data 43 and ensure that the proper extension identifier is associated with the IP address of each IP phone 12 and 31, as will be described in more detail hereafter. Also, the PBX 15 comprises a local table 51 for storing the IP address and MAC address for each phone 12, as will be described in more detail hereafter.

The DHCP server 23 is configured to communicate with each IP phone 12 and 31 and to specify an IP address for each respective IP phone 12 and 31. The DHCP server 23 is further configured to specify the IP address of the boot server 22 to the IP phones 12 and 31 in order to allow the IP phones 12 and 31 to access their configuration files 40 and 41 from the boot server 22. The PBX 15, the router 21, the IP phones 12, the boot server 22 and the DHCP server each have an address resolution protocol (ARP) table 50, which is configured to associate IP addresses with MAC addresses and to store each IP address and MAC address pair as an entry in the table 50. In this regard, for example, when an IP phone 12 attempts to register with the PBX 15 after installation, the IP phone 12 is provisioned with the IP address of the PBX 15 but does not necessarily know the MAC address of the PBX 15. The phone 12 transmits an ARP request to the other devices (e.g., the PBX 15, the router 21, the boot server 21, and the DHCP server 23) coupled to the switch 17 in order to learn the MAC address of the PBX 15. Such ARP request specifies the IP address of the PBX 15 which is used by the devices to look up the MAC address of the PBX 15 in their respective ARP, and any device that receives the ARP request and has the MAC address associated with such IP address stored in its ARP table 50 transmits an ARP reply to the IP phone 12 indicating the associated MAC address. Upon receiving the ARP reply containing the MAC address of the PBX 15, the IP phone 12 creates an entry in its ARP table 50 associating the IP address of the PBX 15 with the MAC address of the PBX 15.

Once the IP phone 12 has learned the MAC address of the PBX 15 and stored the information in the ARP table 50, the IP phone 12 transmits a register message, which is in the form of an IP packet that specifies the phone's IP address and the PBX's IP address in the packet's overhead. In one embodiment, the payload of the IP packet contains the phone's MAC address, but the IP packet may not contain the phone's MAC address in other embodiments, as will be described in more detail hereafter. In one embodiment, the switch 17 is an Ethernet switch that is coupled to the IP phone 12 via an Ethernet connection, though other protocols may be used in other embodiments. Thus, in the instant embodiment, the IP phone 12 encapsulates the register message into an Ethernet frame, and the overhead of the Ethernet frame specifies the phone's MAC address as the packet's source and the PBX's MAC address as the packet's destination. Accordingly, the payload of the Ethernet frame specifies the phone's IP address as the packet's source and the PBX's IP address as the packet's destination. Upon receiving the register message, the switch 17 accesses the destination MAC address from the overhead of the packet and forwards the packet to the PBX 15 based on the destination MAC address.

Upon receiving the IP packet, the PBX 15 automatically associates the IP address with the phone's MAC address. In this regard, in one embodiment, the PBX 15 learns the IP address and the MAC address of the IP phone 12 from the IP packet and populates a local table 51 stored in the memory 60 of the PBX 15. Thus, the MAC address of the IP phone 12 is automatically mapped to the IP address of the IP phone 12 and stored in the local table 51. In an alternative embodiment, the register message transmitted by the IP phone 12 does not include the phone's MAC address. In such embodiment, the PBX 15 accesses the ARP table 50 in order to learn the phone's MAC address. In the event that the ARP table 50 does not contain the phone's MAC address, the PBX 15 transmits an ARP request in order to automatically learn the MAC address of the phone 12 based on the phone's IP address. Accordingly, upon learning the phone's MAC address, the PBX 15 stores the MAC address in the ARP table 50 and automatically associates the phone's IP address and MAC address in the local table 51 thereby obviating the need for a user to manually associate this information.

The IP phone 12 is configured to communicate with the DHCP server 23, the boot server 22, the PBX 15, and the switch 17 and to store settings for the IP phone 12 based upon user input. In this regard, in one embodiment, when an IP phone 12 is installed and connected to the switch 17, the IP phone 12 communicates with the DHCP server 23 in order to obtain an IP address for the phone 12 and to learn the IP address of the boot server 22. The phone 12 performs an ARP request in order to learn the MAC address of the boot server 22 and creates an entry associating such addresses in the ARP table 50 of the phone 12, as set forth above. The phone 12 then accesses the boot server 22 and requests the configuration file 40 corresponding to the phone's MAC address, referred to hereafter as the phone's "unique configuration file 40." If no unique configuration file 40 exists for the phone's MAC address, the phone 12 is assigned at least one configuration file 41 having a default extension identifier, referred to hereafter as the "default configuration file 41," discussed in more detail hereafter. Such default configuration file 41 provides the IP phone 12 with a default set of functions. However, if at least one configuration file 40 corresponds to the phone's MAC address, the unique configuration file 40 having a unique extension identifier and a unique set of functions is used to configure the IP phone 12. Note that the boot server 22 may contain more than one default configuration file 41 and more than one unique configuration file 40 for each phone 12 and 31, but one default configuration file 41 and one unique configuration file 40 for each phone 12 and 31 will be described herein for illustrative purposes.

Similarly, the IP phone 31 is configured to communicate with the DHCP server 23, the boot server 22, and the PBX 15 and to store settings for the IP phone 31 based upon user input. When the IP phone 31 is installed and connected to the router 35, the IP phone 31 obtains its IP address from the DHCP server 23. The IP phone 31 then transmits a register message to the PBX 15, as set forth above with respect to the IP phone 12. As an example, the register message may be in the form of an IP packet encapsulated in an Ethernet frame, which has fields for specifying the phone's MAC address as the frame's source and for specifying the PBX's MAC address as the frame's destination in the overhead of the Ethernet frame. The phone's IP address and the PBX's IP address are included in the payload of the Ethernet frame, as set forth above. Thus, the PBX 15 learns both the IP address and the MAC address of the remote IP phone 31 from the register message that is transmitted by the IP phone 31, as set forth above. In other embodiments, yet other techniques may be employed by the PBX 15 to learn the IP and MAC addresses of the IP phones 12 and/or 31.

Figure 2:
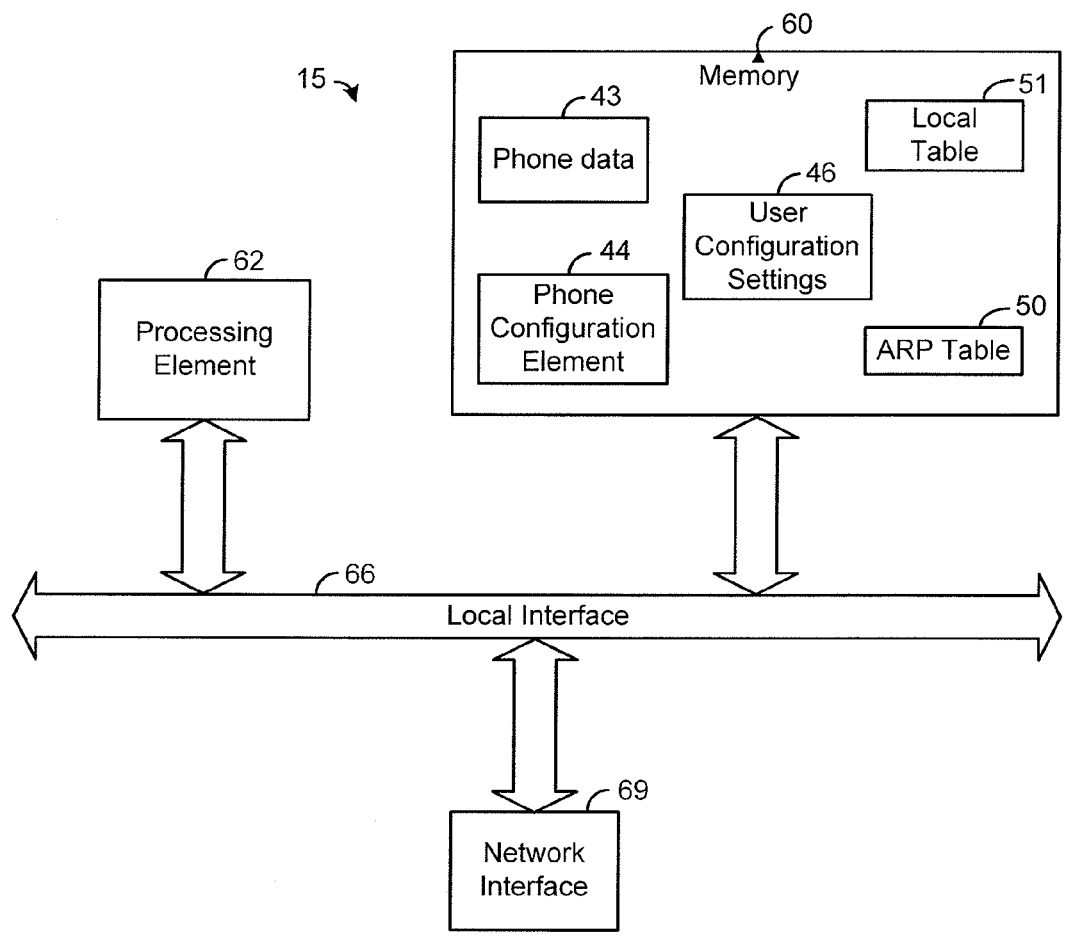
FIG. 2 is a block diagram illustrating an exemplary embodiment of a PBX, such as is depicted by FIG. 1.

FIG. 2 depicts an exemplary embodiment of a PBX 15. As shown by FIG. 2, the PBX 15 comprises phone data 43, a phone configuration element 44, user configuration settings 46, an ARP table 50, and a local table 51. The phone data 43 maps the IP address of each IP phone 12 and 31 (FIG. 1) to the phone's extension identifier. In one embodiment, the phone data 43 comprises a table stored in memory 60 of the PBX 15, and the table has a plurality of entries in which each entry stores an associated IP address and extension identifier for a respective IP phone 12 and 31.

Note that the phone data 43 is used by the PBX 15 to route calls. As an example, the PBX 15 may receive a call request specifying a particular extension identifier as the call's destination. In such case, the PBX 15 uses the extension identifier to lookup in the phone data 43 the IP address of the phone that is to receive the call. The PBX 15 then routes the call to the destination phone using such IP address. The use of phone data 43 to route calls within a PBX is generally well known and will not described in detail herein.

The user configuration settings 46 indicate user preferences for user-configurable features, such as button layout and language, for each IP phone 12 and 31. In one embodiment, the user configuration settings 46 are stored in memory 60 of the PBX 15. The user configuration settings 46 for a given IP phone 12 and 31 are defined by a user during a registration session wherein the user dials a registration extension number and is prompted for the phone's configuration preferences, described in more detail hereafter. The phone configuration element 44 is configured to generate the unique configuration files 40 for the IP phones 12 and 31 based on the user configuration settings 46, and the unique configuration file 40 for a given IP phone 12 and 31 associates the phone's MAC address with a unique extension identifier for the phone. Thus, once the user configuration settings 46 for a phone 12 and 31 are defined, the phone configuration element 44 generates the unique configuration file 40 for the phone 12 and 31 and stores the unique configuration file 40 at the boot server 22 (FIG. 1). After generating the unique configuration file 40 for an IP phone 12 and 31, the phone configuration element 44 is further configured to cause the phone 12 and 31 to reboot at which point the phone 12 and 31 requests its unique configuration file 40. In this regard, the unique configuration file 40, rather than the default configuration file 41, is used to configure the IP phone 12 and 31.

The ARP table 50 is used by the PBX 15 to associate IP addresses of other devices with their respective MAC addresses, as set forth above. The PBX 15 may also access information in the ARP table 50 in order to transmit an ARP reply to an ARP request received from another device coupled to the switch 17 (FIG. 1). The PBX 15 uses the local table 51 to store the IP address and the MAC address of each IP phone 12 that registers with the PBX 15.

It should be noted that the phone configuration element 44 can be implemented in software, hardware, firmware or any combination thereof. In an exemplary embodiment illustrated in FIG. 2, the phone configuration element 44 is implemented in software and stored in memory 60 of the PBX 15.

Note that the phone configuration element 44, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the PBX 15 depicted by FIG. 2 comprises at least one conventional processing element 62, such as a digital signal processor (DSP) or a central processing unit (CPU), that communicates to and drives the other elements within the PBX 15 via a local interface 66, which can include at least one bus. Furthermore, a network interface 69, for example, a plurality of Ethernet ports, can be used by the PBX 15 to communicate with other components of the PBX system 10 (FIG. 1).

Figure 3:
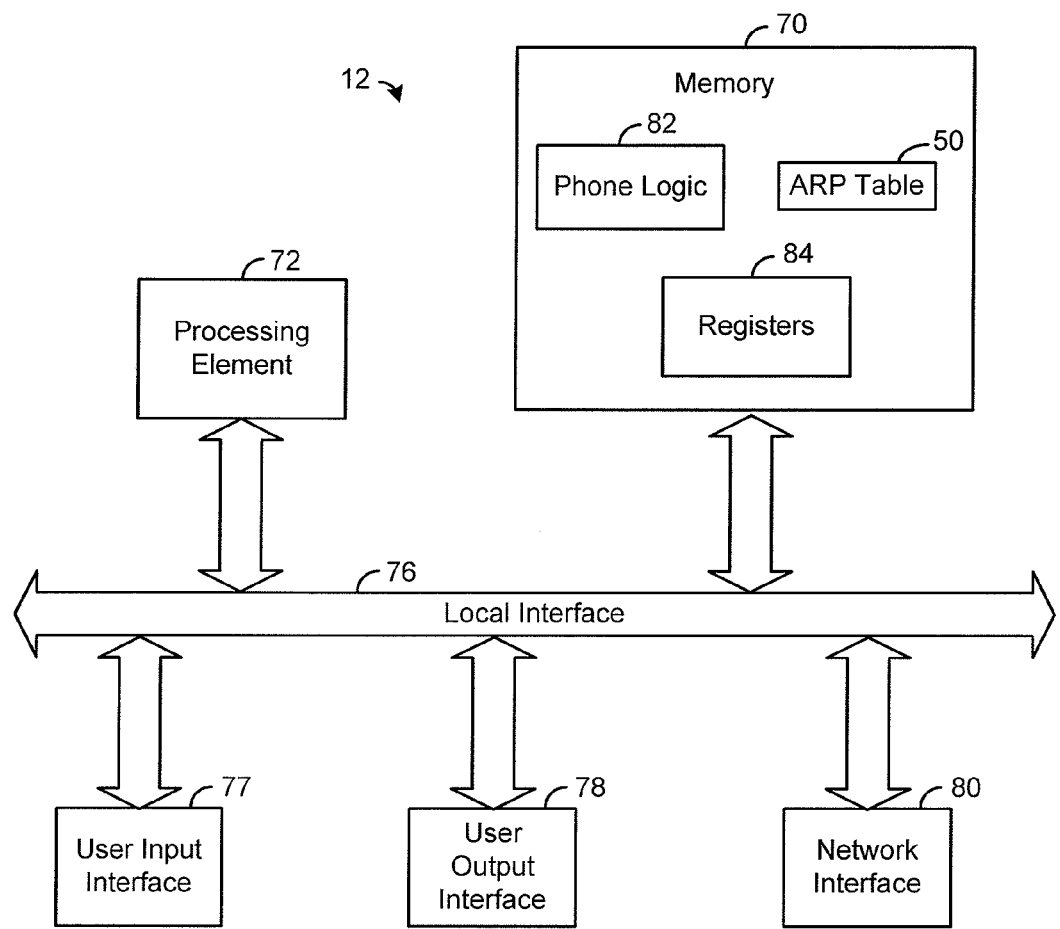
FIG. 3 is a block diagram illustrating an exemplary embodiment of an IP phone, such as is depicted by FIG. 1.

FIG. 3 depicts an exemplary embodiment of an IP phone 12, such as is depicted by FIG. 1. Note that the IP phone 31 is configured similarly to the IP phone 12 but is not shown or discussed with respect to FIG. 3 for the sake of brevity. The IP phone 12 comprises phone logic 82, registers 84, and an ARP table 50. Note that the ARP table 50 is configured and functions similarly to the ARP table 50 of the PBX 15 set forth above with respect to FIG. 2. The registers 84 store settings for the IP phone 12 based on the configuration files 40 and 41 used to configure the IP phone 12. In this regard, if the IP phone 12 is configured with the default configuration file 41, the registers 84 store default settings defined by the default configuration file 41. However, if the IP phone 12 is configured with the phone's unique configuration file 40, the registers 84 store unique settings defined by the user. In one embodiment, the registers 84 may store settings such as, for example, button layout, screen display, busy status, and speed dials. However, other settings are possible in other embodiments.

The phone logic 82 is configured to manage the IP phone 12. In this regard, the phone logic 82 is configured to parse the configuration file 40 or 41 associated with the IP phone 12 and to manipulate the registers 84 based on the configuration file 40 and 41. The phone logic 82 is further configured to communicate with the PBX 15 (FIG. 1), the switch 17 (FIG. 1), the boot server 22 (FIG. 1), and the DHCP server 23 (FIG. 1) via a network interface 80, discussed in more detail hereafter. When the IP phone 12 is initially installed and connected to the switch 17, the phone logic 82 communicates with the DHCP server 23 and requests the IP address of the phone 12 and the IP address of the boot server 22. The phone logic 82 then communicates with the boot server 22 and requests the unique configuration file 40 corresponding to the phone's MAC address. If no unique configuration file 40 for the phone 12 exists at the boot server 22, the phone logic 82 transmits a request to the boot server 22 for the default configuration file 41. In one embodiment, such request identifies the source MAC address of the IP phone 12, although other types of requests are possible in other embodiments. The default configuration file 41 is then downloaded to the IP phone 12.

Upon receiving the default configuration file 41, the phone logic 82 parses the default configuration file 41 and manipulates the registers 84 based upon the default configuration file 41. Accordingly, the IP phone 12 is assigned a default extension identifier. In one embodiment, the PBX 15 initially assigns the same default extension identifier (e.g., 2000) to each IP phone 12 of the PBX system 10 so that each IP phone 12 is configured according to the default configuration file 41, although different default extension identifiers may be assigned to different IP phones 12 in other embodiments. Once the IP phone 12 is configured according to the default configuration file 41, the phone 12 has a basic set of calling functions which enable the user to place calls through the PBX 15, which recognizes the phone 12 by the default extension identifier, as set forth above.

It should be noted that the phone logic 82 can be implemented in software, hardware, firmware or any combination thereof. In an exemplary embodiment illustrated in FIG. 3, the phone logic 82 is implemented in software and stored in memory 70 of the IP phone 12. Note that the phone logic 82, when implemented in software, can be stored and transported on any computer-readable medium for use by or in connection with an instruction execution apparatus that can fetch and execute instructions.

The exemplary embodiment of the IP phone 12 depicted by FIG. 3 comprises at least one conventional processing element 72, such as a digital signal processor (DSP) or a central processing unit (CPU), that communicates to and drives the other elements within the IP phone 12 via a local interface 76, which can include at least one bus. Furthermore, the phone 12 comprises a user input interface 77, such as, for example, a keypad and microphone, which allows the user to input values and audio signals into the phone 12. Further, a user output interface 78, such as, for example, a speaker and/or light-emitting diode (LED) or liquid crystal display (LCD) indicators, allows the user to receive audio and visual signals from the phone 12. Also, the phone 12 comprises a network interface 80, for example, an Ethernet port, which can be used by the IP phone 12 to communicate with other components of the PBX system 10 (FIG. 1).

After the IP phone 12 is configured according to the default configuration file 41, the user may use the IP phone 12 to dial a registration extension number (e.g., 8555) via the user input interface 77 that is recognized by the PBX 15. In this regard, any call request having the registration extension number (e.g., 8555) as the call's destination (a "phone configuration request") initiates a registration session which allows a user to define desired configuration parameters for the IP phone 12. After dialing the registration extension number, the user is prompted by the PBX 15 to provide an input identifying the phone's unique extension identifier (e.g., 8415). In one embodiment, the unique extension identifier may be manually entered via the user input interface 77. However, the user may identify the phone's unique extension identifier through other methods in other embodiments, such as, for example, an audio input or a manual input through the user input interface 77 which identifies the user's name or office number. In such embodiment, a lookup table (not shown) correlating the prompted identified name or office number with the unique extension identifier may be used to determine the unique extension identifier with the IP phone 12. Once the user provides the unique extension identifier to the PBX 15, the PBX 15 updates the extension identifier entry in the phone data 43 such that the unique extension identifier (e.g., 8415), rather than the default extension identifier (e.g., 2000), is used to identify the phone 12. In this regard, the phone data 43 is updated to map the unique extension identifier, rather than the default extension identifier, to the phone's IP address.

The phone configuration element 44 further prompts the user for the phone's configuration preferences until the user configuration settings 46 have been completely defined. The phone configuration element 44 then generates a unique configuration file 40 for the phone 12 based on the newly-defined user configuration settings 46 and transmits such file 40 to the boot server 22, which stores the file 40. Note that the phone configuration element 44 defines the unique configuration file 40 such that it is identified by the MAC address of the IP phone 12 for which the file 40 was created. As an example, the MAC address may be included in the filename of the file 40. Such MAC address may be retrieved from the ARP table 50 located at the PBX 15, as described above, or otherwise automatically learned by the phone configuration element 44.

After creating a unique configuration file 40 for the IP phone 12, the phone configuration element 44 then causes the phone 12 to reboot, as set forth above. Upon reboot, the phone logic 82 contacts the boot server 22 and downloads the newly-generated unique configuration file 40 identified by the phone's MAC address, parses the unique configuration file 40, and configures the phone 12 according to the unique configuration file 40. Thus, the phone 12 is configured according to the user preferences indicated by the user configuration settings 46. As an example, the phone's extension identifier is updated based on the unique configuration file 40. Specifically, the extension identifier is changed from the default extension identifier to the unique extension identifier entered during the foregoing registration session and specified by the phone's unique configuration file 40. Note that the configuration and registration of the IP phone 12 are achieved without the user having to manually associate the user's unique extension identifier and MAC address. In this regard, the MAC address is automatically learned, and the unique extension identifier is learned through interaction with the user via the phone 12. The user, however, is not required to provide the MAC address and, thus, may not actually know the MAC address. The association between the user-supplied unique extension identifier and the MAC address is automatic.

Furthermore, if the IP phone 12 is replaced with a new phone, registration and configuration of the new phone may be similar to the process described above. However, there is no need for the user to be required to define a new set of user configuration settings 46. In this regard, the same set of user configuration settings 46 stored at the PBX 15 may be used to generate the configuration file 40 for the new phone. In one embodiment, such settings 46 may be password protected so that the user is required to provide the password via the user input interface 77 or otherwise before being allowed to change the settings 46.

Figure 4:
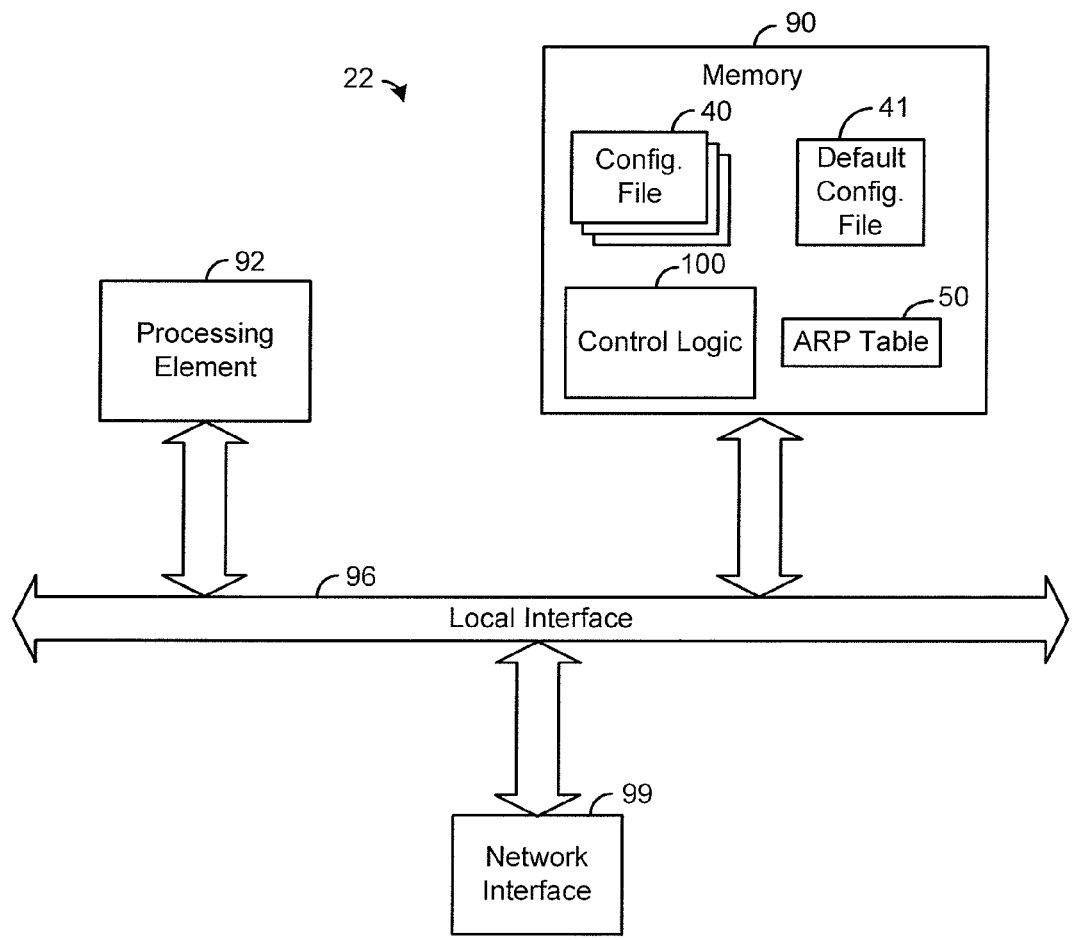
FIG. 4 is a block diagram illustrating an exemplary embodiment of a boot server, such as is depicted by FIG. 1.

FIG. 4 depicts an exemplary embodiment of a boot server 22, such as is depicted by FIG. 1. As set forth above, the boot server 22 stores a plurality of configuration files 40 and 41 and an ARP table 50. The configuration files 40 and 41 comprise at least one default configuration file 41 and at least one unique configuration file 40. In one embodiment, the configuration files 40 and 41 comprise data files, such as, for example, xml or text files, stored in memory 90 of the boot server 22. However, the configuration files 40 and 41 may be other types of files in other embodiments. The boot server 22 further comprises control logic 100 configured to manage the boot server 22. In this regard, when the IP phone 12 requests a configuration file 40 and 41, the control logic 100 is configured to search for the requested configuration file 40 and 41. If the requested configuration file 40 and 41 is found, the control logic 100 transmits the configuration file 40 and 41 to the IP phone 12. However, if the requested configuration file 40 and 41 is not found, the control logic 100 transmits a message to the phone 12 indicating that the requested configuration file 40 and 41 was not found.

It should be noted that the control logic 100 can be implemented in software, hardware, firmware or any combination thereof. In an exemplary embodiment illustrated in FIG. 4, the control logic 100 is implemented in software and stored in memory 90 of the boot server 22. Note that the control logic 100, when implemented in software, can be stored and transported on any computer-readable medium for use by or in connection with an instruction execution apparatus that can fetch and execute instructions.

The exemplary embodiment of the boot server 22 depicted by FIG. 4 comprises at least one conventional processing element 92, such as a digital signal processor (DSP) or a central processing unit (CPU), that communicates to and drives the other elements within the boot server 22 via a local interface 96, which can include at least one bus. Furthermore, the boot server 22 comprises a network interface 99, for example, an Ethernet port, which can be used by the boot server 22 to communicate with other components of the PBX system 10 (FIG. 1).

In one exemplary embodiment, assume that an IP phone 12 is newly installed at an office of a user who has been assigned or desires to use extension identifier 8415. Also, assume that the default extension identifier assigned to each newly-installed phone is 2000.

When the newly-installed IP phone 12 powers up for the first time, the phone logic 82 (FIG. 3) of the IP phone 12 communicates with the DHCP server 23 through the switch 17 to obtain an IP address for the phone 12 and to learn the IP address of the boot server 22. Upon learning the IP address of the boot server 22, the phone 12 transmits an ARP request in order to learn the MAC address of the boot server 22. Upon learning the boot server's MAC address, the phone logic 82 transmits a request to the control logic 100 of the boot server 22 for a unique configuration file 40 based upon the phone's MAC address. In this regard, the phone logic 82 requests the unique configuration file 40 identified by the MAC address of the phone 12. At this point, such a configuration file 40 does not exist. Thus, the control logic 100 transmits a reply message to the phone logic 82 indicating that the requested unique configuration file 40 is not found in the boot server 22.

Figure 5:
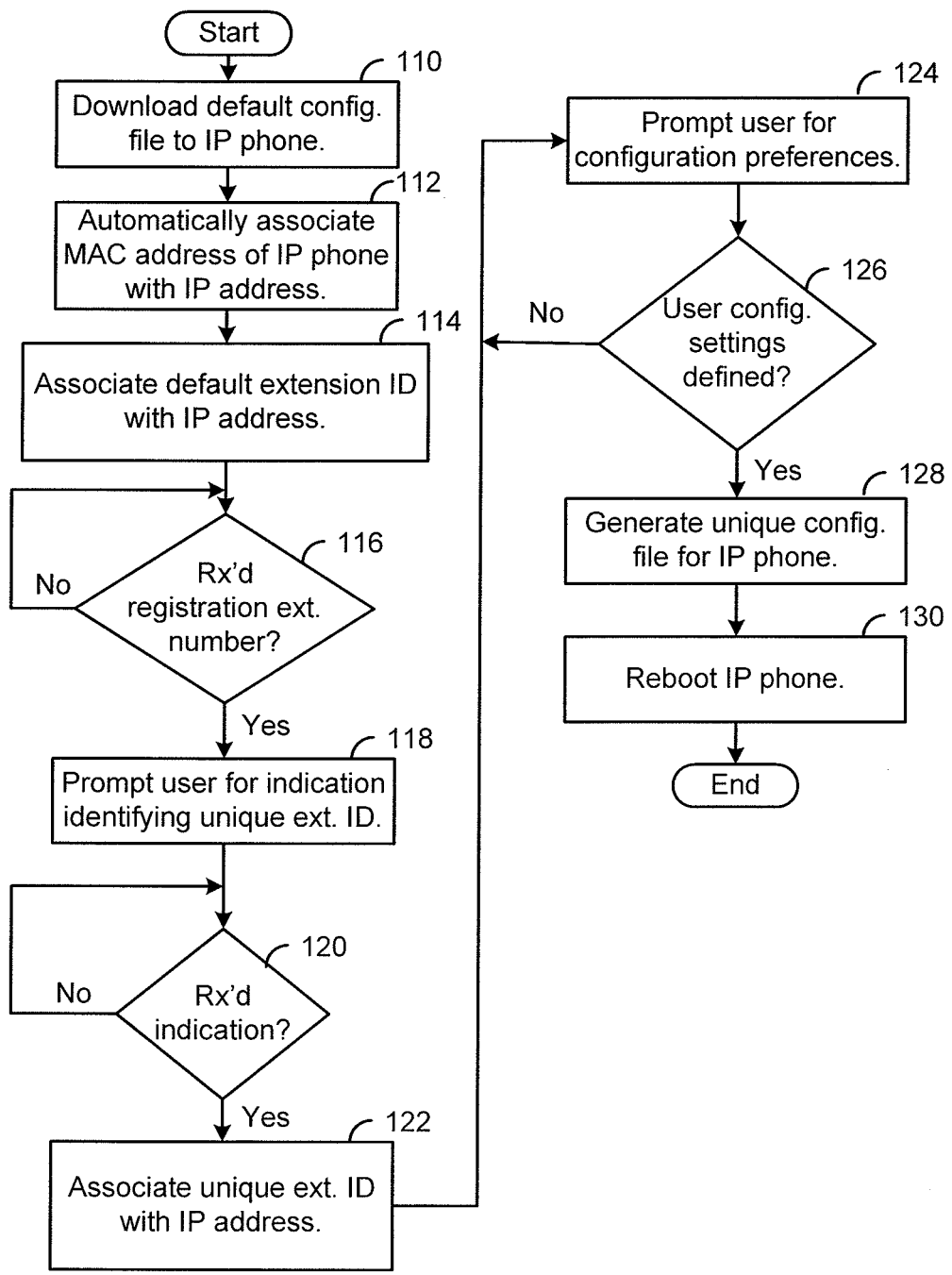
FIG. 5 is a flowchart depicting an exemplary method of configuring and registering an IP phone.

In response to such message, the phone logic 82 then transmits a message to the control logic 100 requesting the default configuration file 41. The control logic 100 retrieves the default configuration file 41 and downloads it to the IP phone 12, as shown by block 110 of FIG. 5. The IP phone 12 then parses the default configuration file 41 and manipulates the registers 86 based upon the file 41. Once the registers 86 are manipulated according to the default configuration file 41, the IP phone 12 is identified by the default extension identifier (e.g., 2000). The phone logic 82 then transmits an ARP request in order to learn the MAC address of the PBX 15. Upon learning the MAC address of the PBX 15, the IP phone 12 sends a register message indicating the phone's IP address and MAC address as well as the PBX's IP address and MAC address to the PBX 15 via the switch 17. The switch 17 forwards the register message to the PBX 15 based on the message's destination MAC address, which identifies the PBX 15 in this case. The PBX 15 receives the register message and associates the phone's MAC address with the phone's IP address based on the register message, as shown by block 112. In this regard, the PBX 15 creates an entry associating the phone's IP address and MAC address in the local table 51.

In response to the register message, as shown by block 114, the phone configuration element 44 (FIG. 1) of the PBX 15 updates the phone data 43 in order to associate the phone's IP address with the default extension identifier (e.g., 2000), which are both included in the register message. In this regard, the phone configuration element 44 creates an entry in the phone data 43 associating the default extension identifier (e.g., 2000) with the IP address of the IP phone 12. Accordingly, the phone 12 has a basic set of calling functionality which allows the user to place calls through the PBX 15, which recognizes the phone 12 by the default extension identifier (e.g., 2000). The phone configuration element 44 transmits a reply message back to the IP phone 12 indicating that the phone 12 is now registered with the PBX 15. Note that such registration is achieved using the default extension identifier (i.e., 2000) rather than the unique extension identifier (i.e., 8415 actually desired for the phone 12).

Now assume that the user wishes to complete registration of the IP phone 12 with the PBX 15. The user takes the phone 12 off-hook and uses the user input interface 77 (FIG. 3) to enter the registration extension number (e.g., 8555) to initiate a phone configuration request, which is received by the PBX 15, as shown by block 116. In response, as shown by block 118, the phone configuration element 44 prompts the user to provide an input indicative of the phone's unique extension identifier (e.g., 8415), which identifies the phone's actual extension number. In one embodiment, such prompt is accomplished by the phone configuration element 44 through an auto attendant, although other prompts are possible in other embodiments. The user then uses the user input interface 77 to enter his or her unique extension identifier (e.g., 8415).

Upon receiving the indication for the unique extension number, as shown by block 120, the phone configuration element 44 updates the phone data 43 such that the unique extension number (e.g., 8415), rather than the default extension identifier (e.g., 2000), is associated with the IP address of the phone 12, as shown by block 122. Furthermore, the phone configuration element 44 prompts the user for the phone's configuration preferences, as shown by block 124, until the user configuration settings 46 have been completely defined by the user, as shown by block 126. Based on such settings 46, including the unique extension identifier (e.g., 8415) entered by the user, the phone configuration element 44 generates a unique configuration file 40 for the phone 12, as shown by block 128, and transmits the file 40 to the control logic 100 of the boot server 22 for storage at the boot server 22. Such unique configuration file 40 is identified by the phone's MAC address. In this regard, when creating the file 40, the phone configuration element 44 retrieves the phone's MAC address from the PBX 15, as described above. After creating the unique configuration file 40 and transmitting such file 40 to the boot server 22, the phone configuration element 44 then causes the phone 12 to reboot, as shown by block 130.

Upon reboot, the phone logic 82 contacts the control logic 100 of the boot server 22 and requests the unique configuration file 40 corresponding to the phone's MAC address. Now that such file 40 has been created and stored at the boot server 22, the unique configuration file 40 is downloaded to the IP phone 12 and the phone 12 is configured according to this unique configuration file 40. In this regard, the phone 12 is configured according to the preferences, including the unique extension identifier, indicated by the user during the registration session initiated in response to the call in which the user entered the registration extension number (e.g., 8555). At this point, the PBX 15 recognizes the IP phone 12 according to its unique extension identifier (e.g., 8415) such that any call having such identifier as the call's destination is routed to the IP phone 12.

According to the exemplary process described above, the MAC address of the phone 12 is automatically learned and the IP phone 12 is configured and registered without a manual association by the user of the MAC address and the phone's unique extension identifier.

Now, therefore, the following is claimed:

1. A private branch exchange (PBX) system, comprising:
a PBX;
at least one Internet protocol (IP) phone coupled to the PBX;
a dynamic host configuration protocol (DHCP) server configured to assign an IP address to the IP phone; and
a boot server configured to store a plurality of configuration files for the IP phone, the configuration files comprising at least one default configuration file configured to provide the IP phone with default settings,
wherein the PBX is configured to automatically learn a media access control (MAC) address of the IP phone, wherein the IP phone is configured to access the default configuration file and to configure itself according to the default settings set forth in the default configuration file in order to allow initiation of a registration session with the PBX, wherein the PBX is further configured to generate at least one unique configuration file for the IP phone based on user input received by the IP phone and transmitted to the PBX from the IP phone during the registration session, wherein the unique configuration file is identified by the MAC address, and wherein the IP phone is configured to access the unique configuration file based on the MAC address and to configure itself according to settings set forth in the unique configuration file, wherein the user input indicates a unique extension identifier for the IP phone, and wherein the PBX is configured to associate the learned MAC address with the unique extension identifier in memory.

2. The PBX system of claim 1, wherein the PBX has a local table, and wherein the PBX is configured to transmit an address resolution protocol (ARP) request in order to retrieve the MAC address and to store the MAC address in the local table.

3. The PBX system of claim 1, wherein the PBX is configured to learn the MAC address from a message transmitted to the PBX from the IP phone during the registration session.

4. The PBX system of claim 1, wherein the default configuration file comprises a default extension identifier, and wherein the IP phone is configured to register with the PBX using the default extension identifier such that the PBX associates the default extension identifier with the MAC address in the memory.

5. A method for registering an Internet protocol (IP) phone with a private branch exchange (PBX), comprising:
transmitting a default configuration file from a boot server to the IP phone;
configuring the IP phone according to the default configuration file thereby enabling the IP phone to initiate a registration session with the PBX;
receiving at the IP phone user input indicative of a unique extension identifier for the IP phone;
transmitting the user input from the IP phone to the PBX during the registration session;
automatically learning a media access control (MAC) address of the IP phone at the PBX;

associating the learned MAC address with the extension identifier in memory at the PBX based on the user input and the learning;

generating at least one unique configuration file for the IP phone at the PBX based on the user input, wherein the unique configuration file is identified by the MAC address;

selecting the unique configuration file for transmission to the IP phone based on the MAC address;

transmitting the unique configuration file from the PBX to the IP phone based on the selecting; and configuring the IP phone based on the unique configuration file.

6. The method of claim 5, further comprising transmitting the MAC address via a message from the IP phone to the PBX during the registration session, wherein the learning is based on the message.

7. The method of claim 5, wherein the default configuration file comprises a default extension identifier, and wherein the method further comprises registering the IP phone with the PBX using the default extension identifier such that the PBX associates the default extension identifier with the MAC address in the memory.

* * * * *